United States Patent [19]

Torisawa

[11] Patent Number: 4,571,686
[45] Date of Patent: Feb. 18, 1986

[54] TRACK MONITORING SYSTEM FOR A CUTTER TIP OF A TOOL POST IN MACHINE TOOLS

[75] Inventor: Yoshio Torisawa, Kasugai, Japan

[73] Assignee: Kabushiki Kaisha Okuma Tekkosho, Nagoya, Japan

[21] Appl. No.: 456,724

[22] Filed: Jan. 10, 1983

[30] Foreign Application Priority Data

Mar. 5, 1982 [JP] Japan ............................ 57-34930

[51] Int. Cl.$^4$ ............... G06F 15/46; G05B 19/18
[52] U.S. Cl. ............................ 364/474; 364/150; 364/153; 318/567; 318/570
[58] Field of Search ............... 364/152–155, 364/178–179, 513, 520, 474–475, 148–150; 318/567–570, 578, 636; 901/2–5

[56] References Cited

U.S. PATENT DOCUMENTS

| | | | |
|---|---|---|---|
| 3,909,600 | 9/1975 | Hohn | 364/513 X |
| 4,088,899 | 5/1978 | Miller et al. | 364/474 X |
| 4,105,937 | 8/1978 | Tuda et al. | 364/513 X |
| 4,132,938 | 1/1979 | Sano et al. | 364/513 X |
| 4,135,239 | 1/1979 | Hamill, III et al. | 364/474 X |
| 4,224,670 | 9/1980 | Yamazaki | 364/474 |
| 4,258,425 | 3/1981 | Ramsey et al. | 364/513 |
| 4,305,128 | 12/1981 | Manabe et al. | 364/475 |
| 4,356,552 | 10/1982 | Imazeki et al. | 364/474 |
| 4,386,408 | 5/1983 | Imazeki et al. | 364/474 |

Primary Examiner—Gary V. Harkcom
Attorney, Agent, or Firm—Wenderoth, Lind & Ponack

[57] ABSTRACT

In machine tools it is necessary to monitor the track of a cutter tip on a tool post. A predetermined tolerance scope is given to sampling positions during the model cutting, and only the data of the points and distance defining the tolerance scope is stored. During the actual cutting, a determination is made as to whether or not a sampling position is within the tolerance scope and the track is thereby securely monitored.

3 Claims, 5 Drawing Figures

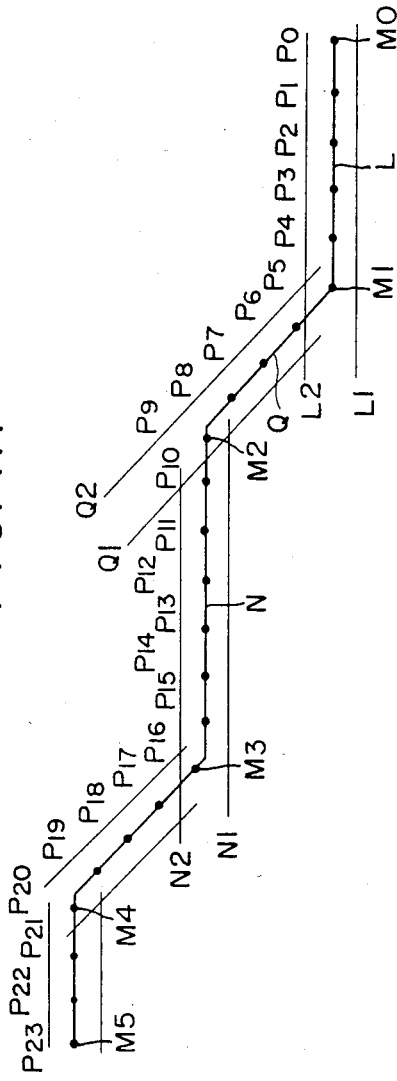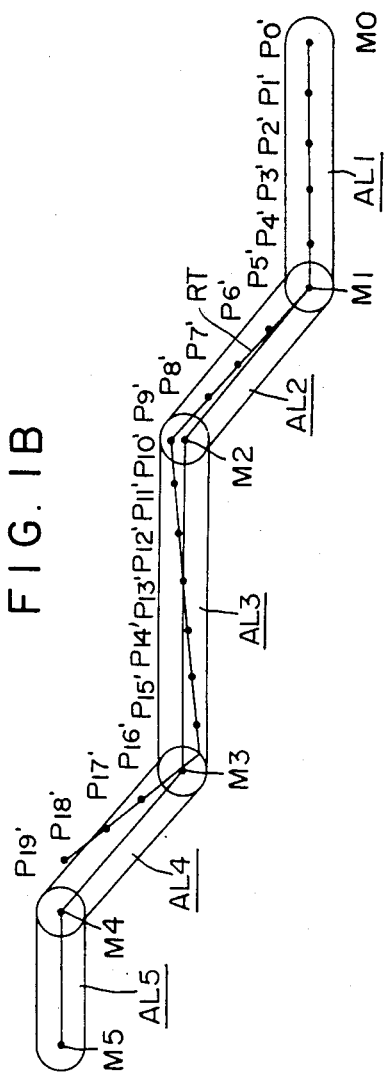

FIG. 3A

| SAMPLING POSITIONS | P0 | P1 | P2 | P3 | P4 | P5 | P6 | P7 | P8 | P9 | P10 | P11 | P12 | P13 | P14 | P15 | P16 | P17 | P18 | P19 | P20 | P21 | P22 | P23 |
|---|---|---|---|---|---|---|---|---|---|---|---|---|---|---|---|---|---|---|---|---|---|---|---|---|
| REGISTER 6 | P0 | P0 | | | | P5 →| | | | P9 →| | | | | | | P16 →| | | | P20 →| | | |
| REGISTER 8 | | P1 →| | | | P6 →| | | | P10 →| | | | | | | P17 →| | | | P21 →| | | |
| REGISTER 3 | P0 | P1 | P2 | P3 | P4 | P5 | P6 | P7 | P8 | P9 | P10 | P11 | P12 | P13 | P14 | P15 | P16 | P17 | P18 | P19 | P20 | P21 | P22 | P23 |
| MEMORY 4 | P0 (M0) | | | | | P5 (M1) | | | | P9 (M2) | | | | | | | P16 (M3) | | | | P20 (M4) | | | P23 (M5) |
| 11 | 0 | 0 | 0 | 0 | 0 | 1 | 0 | 0 | 0 | 1 | 0 | 0 | 0 | 0 | 0 | 0 | 1 | 0 | 0 | 0 | 1 | 0 | 0 | 0 |

COMPARATIVE CONTROL CIRCUIT

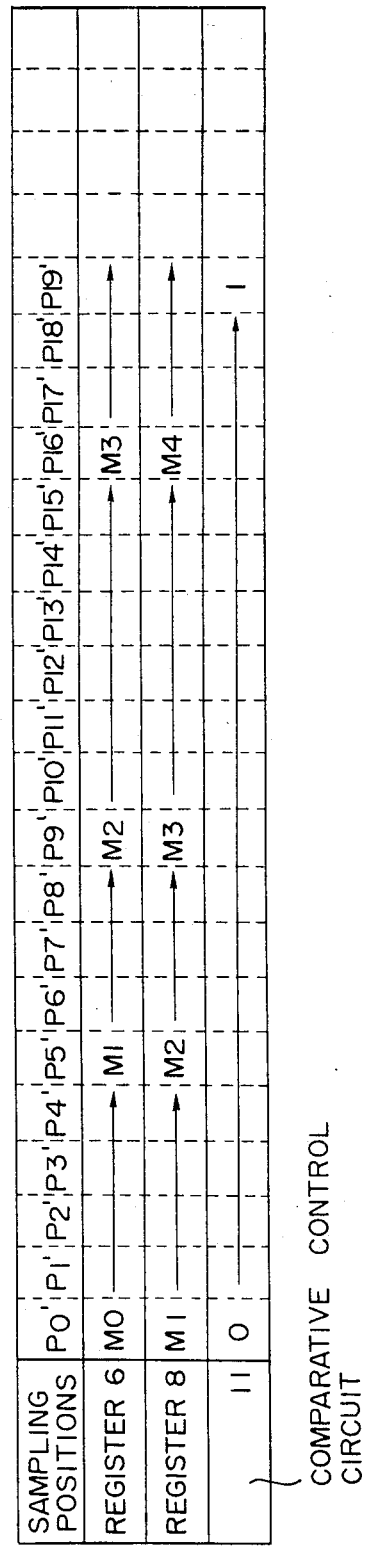

TRACK MONITORING SYSTEM FOR A CUTTER TIP OF A TOOL POST IN MACHINE TOOLS

BACKGROUND OF THE INVENTION

This invention relates to a track monitoring system for a cutter tip of a tool post in a machine tool.

Monitoring systems of this type conventionally effect the steps of storing all the positions of a tool post cutter tip which were sampled during the time of model cutting and then comparing the actual cutting data with the stored data for supervising the process. The prior art method, however, is inconvenient in that the amount of memory becomes enormous since the stored data has to correspond to all of the tracks.

SUMMARY OF THE INVENTION

Accordingly, an object of this invention is to provide a track monitoring method for machine tools which can obviate above mentioned defects by reducing the amount of data stored at model cutting.

Another object of this invention is to provide a monitoring apparatus which can securely monitor a track of cutter tip in machine tools during the time of actual cutting.

The present invention provides a track monitoring system and method for controlling a cutter tip of a tool post in machine tools, which can determine whether or not the track of a cutter tip during actual cutting remains with the set tolerance scope from the break points of the sampling positions.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A and 1B are views to explain the principles of this invention, respectively;

FIGS. 3A and 3B are data tables to explain the operation thereof.

DETAILED DESCRIPTION OF THE INVENTION

Figure 2:
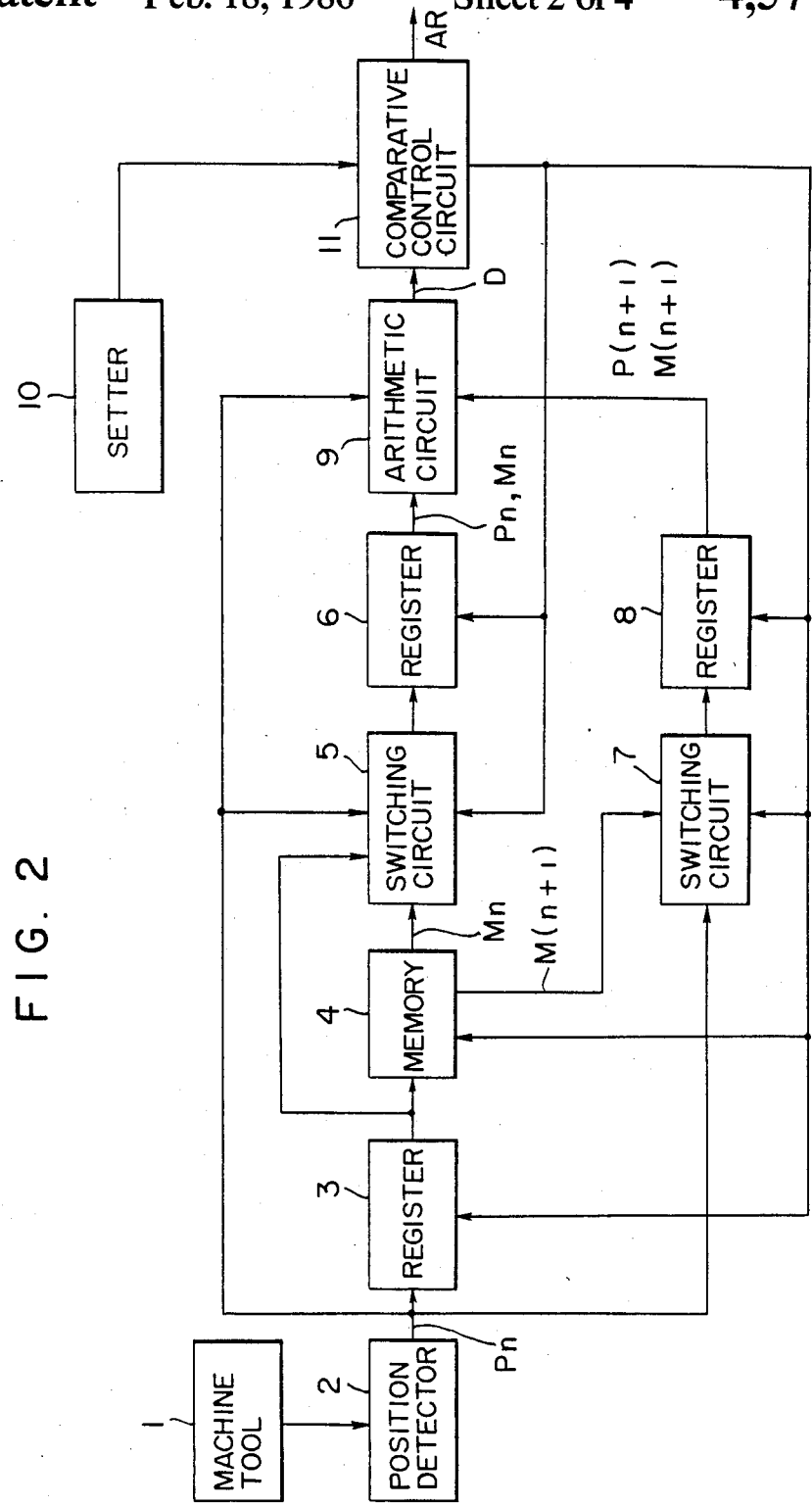
FIG. 2 is a block diagam to show an embodiment of this invention.

This invention comprises the steps of sampling and storing the track of the cutter tip on a tool post during the time of model cutting, and comparing the stored track with actual track during the time of the actual cutting operation. The method comprises, more particularly, the steps of assuming first tolerance lines which are parallel to and at a predetermined tolerance distance from a straight line obtained by connecting the first point (M0) and the second point of sampling positions so as to store the first point (M0) during the time of model cutting, assuming second tolerance lines which are parallel to and at a predetermined tolerance distance from a straight line obtained by connecting the (S+1)th point (S≧2) of sampling positions which are beyond the first tolerance lines with the S point (M1) of the sampling postion which are within the first tolerance lines in order to stored the S point (M1), and successively storing subsequent sampling positions, M2, M3, ... Mn in the same manner as above, thereby detecting whether or not a position sampled during the time of actual cutting remains within the tolerance lines of the predetermined tolerance distance from the stored sampling positions M0, M1, ... Mn. FIGS. 1A and 1B are views used to illustrate the principle of this invention. More specifically, FIG. 1A shows the track during the time of model cutting while FIG. 1B that of the actual cutting. The reference symbols P0 to P23 denote sampling positions during the time of model cutting while P0' to P19' denote sampling positions during actual cutting. If we suppose that the locus extending from the point M0 to M5 through M1, M2, M3 and M4 is obtained at the time of model cutting, it is possible to assume a straight line L connecting the first sampling position P0 with the second sampling position P1.

The method further comprises assuming lines L1 and L2 which are respectively parallel to the line L and have a predetermined tolerance distance therefrom, designating the lines L1 and L2 as the tolerance scope and judging whether a sampling position is within the scope defined by the lines L1 and L2. If it is determined that a sampling position P6 is outside of the tolerance lines L1 and L2, a method is adopted so as to obtain a linear line Q by connecting the outside sampling position P6 with the last sampling position P5 of those sampling positions remaining within the scope between the tolerance lines L1 and L2, as well as to store the sampling position P5 as M1. In a manner similar to the case of the line L, the method judges whether a sampling point is between the tolerance lines Q1 and Q2 by assuming two tolerance lines Q1 and Q2 having a predetermined distance from the line Q. Then it assumes a linear line N which connects a sampling position P10 which is the first position to go beyond the tolerance lines Q1 and Q2 with a sampling position P9 which is the last point of sampling positions staying within the scope defined by the above two lines, and stores the sampling position P9 as M2.

As described above, the method is adopted so as to set the first tolerance scope including a linear line connecting the first and the second sampling positions, and to set the second tolerance scope including a linear line assumed by connecting the first sampling point of those points which are outside of the first tolerance scope with the last sampling point of those points within the first tolerance scope, and to then set the third tolerance scope including a linear line assumed by connecting the first point of those points which are outside the second tolerance scope with the last point of those points which stay within the second tolerance scope and continue sequentially the same operation of setting tolerance scopes for the subsequent track of the cutter tip on the tool post. The sampling positions M0 to M5 of respective tolerance scopes thus obtained are stored in memories and the predetermined tolerance distance is set in a setter relative to the lines corresponding to M0-M1, M1-M2, M2-M3, M3-M4 and M4-M5. The tolerance zones AL1, AL2, AL3, AL4 and AL5 shown in FIG. 1B are thus set.

If we obtain the track of the cutter tip during the actual cutting since shown by RT in FIG. 1B, as all of the sampling positions from P0' to P18' remain within the tolerance zones AL1 to AL4 thereof, it can be confirmed that the both tracks of the cutter tip at the model cutting and that at the actual cutting stay within the predetermined tolerance scope. But since the sampling position P19' lies outside of the tolerance scope AL4, it is determined that the position of the cutter tip on the tool post during the sampling point P19' deviates from the predetermined tolerance scope.

As described in the foregoing, simply by storing the break points of the sampling positions within the respective tolerance scope for the path from the first sampling point to the last sampling point and the tolerance scope relative to those sampling positions in a setter, it is possible according to this invention to readily determine whether the track of a cutter tip during actual cutting remains within the tolerance scope set from the track during the model cutting. The present method does not need to store all the sampling positions and, therefore, can minimize the memory capacity.

The apparatus for the above mentioned method will now be explained referring to an embodiment shown in FIG. 2, wherein FIGS. 3A and 3B illustrate the operation thereof.

A position signal Pn from a position detector 2 for detecting the position of a cutter tip which is mounted on a tool post of a machine tool 1 is fed to a register 3 as well as to switch circuits 5 and 7 and to an arithmetic circuit 9, respectively. The output from the register 3 is fed to a memory 4 and the switch circuit 5. The output M(n+1) outputted from the memory 4 is fed to the switch circuit 7; the output from the switch circuit 5 is fed to a register 6, and the output from the switch circuit 7 is fed to a register 8. The outputs Pn, Mn and P(n+1), M(n+1) from the registers 6 and 8 are inputted to the arithmetic circuit 9, respectively; the output D from the arithmetic circuit 9 in turn is inputted to a comparative control circuit 11 so as to be compared with a preset value from a setter 10. The comparative control circuit 11 outputs an alarm signal AR as well as controls the register 3, the memory 4, the switch circuits 5 and 7, and registers 6 and 8 with predetermined timings. The register 6 is used to temporarily store the output from the switch circuit 5 under the control from the comparative control circuit 11. The switch circuit 7 is used to output a position signal Pn during the model cutting, and to output the content of the memory 4 during the time of actual cutting and to temporarily store the output from the switch circuit 7 under the control from the comparative control circuit 11. The arithmetic circuit 9 receives as inputs thereto the outputs from the registers 6 and 8 and a position signal Pn, and is used to obtain a linear line connecting the point indicated by the output from the register 6 with the point indicated by the output from the register 8 and to obtain the distance D of the position signal Pn from the line.

In the construction mentioned above, during the model cutting, an initial position P0 is first outputted as a position signal from a position detector 2 for a cutter tip, and is stored in the register 6 through the switch circuit 5 as well being stored as in the register 3. The content of the register 3 is stored in the memory 4 as a point M0. In short, when the sampling position is P0 as shown in FIG. 3A, position P0 is stored in the registers 6 and 3 and the memory 4. When the sampling position proceeds to P1, the position P1 is stored in the register 8 through the switch circuit 7. When the position further proceeds to P2, position P0 stored in the register 6, position P1 stored in the register 8, and the sampling position P2 are inputted respectively to the arithmetic circuit 9 to obtain the distance D between a linear line L connecting the point P0 and P1 and the position P2 and then to compare thus obtained distance D with the preset value set by the setter 10 in the comparative control circuit 11. Since the zone sandwiched between the linear lines L1 and L2 shown in FIG. 1A has widths within a predetermined value set by a setter 10 on both sides of the linear line L, and the sampling position P2 exists in a zone between the lines L1 and L2, the result of comparison in the comparative control curcuit 11 becomes "0". Obtaining such a result, the comparative control circuit 11 outputs a command to store the sampling position P2 in the register 3, and the register 3 stores the sampling position P2. The registers 6 and 8 do not change and still store the sampling positions P0 and P1. Since even if the sampling position proceeds to P3, the registers 6 and 8 still store the position P0 and P1, the arithmetic circuit 9 operates in order to obtain the distance between the linear line L connecting the positions P0 and P1 and the point P3. As the sampling position P3 stays between the lines L1 and L2 as is the case of position P2, the register 3 is made to change to the position P3 as is the case of the sampling position P2. As the sampling position proceeds to P4, P5 . . . thereafter, only the register 3 is made to change to P4, P5 . . . . At the time when the sampling position comes to P6, which goes beyond the scope defined by lines L1 and L2, the distance between the sampling position P6 and the linear line (L) connecting the point stored in the register 6 (which stores P0) and the point stored in the register 8 (which stores P1) exceeds the preset value set by the setter 10. The result of the comparison in the comparative control circuit 11 then changes from a "0" to a "1", generating a command to store the content (P5) of the register 3 in the memory 4 and the memory 4 stores the register 3's content (P5) as M1. Simultaneously, the comparative control circuit 11 generates a command to renew the content (P0) of the register 6 to be the content (P5) of the register 3.

The circuit further commands, through the switch circuit 7, that the content (P1) of the register 8 be the sampling position P6, and the content (P5) of the register 3 be the sampling position P6. In such a manner, the sampling position P5 is stored in the register 6, and the sampling position P6 is stored in the registers 8 and 3 and the sampling position P5 is stored in the memory 4 as M1.

When the sampling position proceeds to P7, the arithmetic circuit 9 calculates the distance between the sampling position P7 and the linear line Q connecting the point (P5) stored in the register 6 and the point (P6) stored in the register 8 and the comparative control circuit 11 compares the distance with the preset value from the setter 10. Since the sampling position P7 remains within the tolerance distance set by the setter (i.e. the zone between the linear lines Q1 and Q2), the result of the comparison becomes a "0" and the content of the register 3 is changed from P6 to P7. When the sampling position proceeds further to P8, P9 . . . , since they all are within the scope between the linear lines Q1 and Q2, the content of the register 3 alone is changed from P7 to P8 and to P9. When the sampling position reaches P10, the distance between the position P10 and the linear line Q exceeds the preset value, making the content (P9) of the register 3 stored in the register 6 as is the case during the time when the position moves from P5 to P6 and at the same time, the content (P9) of the register 3 is stored as M2 in the memory 4. The sampling position P10 is stored in the registers 8 and 3. This allows the determination of the length of the straight line N connecting P9 (the content of the register 6) and P10 (the content of the register 8) as well as the tolerance scope (between N1 and N2).

Similarly for the subsequent track, the memory 4 stores the sampling position P16 as M3 and position P20 as M4. Even if the final point P23 remains within the scope of the preset value, the memory 4 stores it as M5. FIG. 3A shows a table of data for the positions P0 to P23 as appearing in the registers 6, 8 and 3, the memory 4 and the comparative control circuit 11 during the time of model cutting. In such a manner as above, during the time of actual cutting, the distance between any sampling position of P0′ through P19′ and the linear line determinable by M0 to M5 (i.e. M0-M1, M1-M2, M2-M3, M3-M4, M4-M5) is obtained based upon the data M0 to M5 stored during the time of model cutting, and a determination is made as to whether or not the thus obtained distance is within a predetermined tolerance distance and if the distance is outside of the scope of tolerance, an alarm signal AR will be outputted. In operation, more particularly, M0 is first transferred from the memory 4 to the register 6 and M1 is stored in the register 8. Then, the distance from the sampling position P0′ to the linear line connecting M0 and M1 is obtained by the arithmetic circuit 9 and the comparative control circuit 11 determines whether or not the distance is within the tolerance distance. In the case shown in FIG. 1B, since the distance remains within the tolerance zone AL1, no alarm signal AR is generated. Similarly, as the sampling position moves to P0′, P1′, P2′. . . and when it reaches P5′, the memory 4 transfers M1 to the register 6 and transfers M2 to the register 8. P5′ is used to determine whether or not the point remains in the tolerance scope AL2 while sampling position P9′ is used to determine whether or not the point remains in the tolerance scope AL3. Up until the sampling position comes to P18′, since the sampling positions stay in respective tolerance scopes, the output signal from the comparative control circuit 11 remains as a "0" (refer to FIG. 3B). At the sampling position P19′, however, since the point lies outside of the tolerance scope AL4, the output signal from the comparative control circuit 11 becomes a "1" and an alarm signal AR is generated from the circuit 11.

Although this invention has been described for the case where the sampling position extends from P0 to P23, the number of sampling points and the form of the track of a cutter tip on a tool post may be selected arbitrarily and this invention can be appropriately applied to any forms of tracks in the same manner as described above.

What is claimed is:

1. A track monitoring apparatus for a cutter tip of a tool post mounted on a machine tool, comprising:
    a position detector for detecting the position of the cutter tip of the tool post;
    a first register for storing position data outputted from said position detector;
    a memory for storing data output from said first register;
    a second register for storing said position data from said position detector and said output data from said first register and first output data from said memory which is input thereto through a first switch circuit;
    a third register for storing said position data from said position detector and second output data from said memory which is input thereto through a second switch circuit;
    an arithmetic circuit for receiving said position data and output data from said second register and output data from said third register and for calculating a distance between a predetermined linear line and a present position;
    a setter for setting a predetermined tolerance distance for positional deviation; and
    a comparative control circuit which controls said first through third registers as well as said first and second switch circuits and which outputs an alarm signal when said calculated distance is greater than said predetermined tolerance distance.

2. A track monitoring method for a cutter tip of a tool post mounted on a machine tool of the type which stores sampling points of a track of the cutter tip during the time of model cutting and which compares the thus stored model sampling points with the actual points of a track of a cutter tip obtained during the time of actual cutting, comprising the steps of:
    assuming a first tolerance scope which corresponds to the distance between two lines which are respectively at a first constant distance from and parallel to a first linear line obtained by connecting a first sampling point (M0) and a second sampling point during the time of said model cutting;
    storing the coordinates of said first sampling point (M0);
    assuming a second tolerance scope which corresponds to the distance between two lines which are respectively at a second constant distance from and parallel to a second linear line obtained by connecting an $(S+1)$th sampling point (wherein $S \geq 2$) which lies outside of said first tolerance scope but within said second tolerance scope and an Sth point (M1) which remains within said first tolerance scope;
    storing the coordinates of said Sth point (M1);
    storing the coordinates of sampling points M2, M3, M4 . . . Mn which are subsequently obtained by repeating steps corresponding to the steps used to obtain the coordinates of point M1; and
    monitoring said actual points so as to determine whether said actual points of said cutter tip during an actual cutting remain within the tolerance scopes which respectively correspond to the distance between two lines which are a constant distance from a line connecting to said stored sampling points M0, M1, . . . Mn.

3. A track monitoring method for a cutter tip of a tool post mounted on a machine tool as claimed in claim 2, wherein said sampling points M0, M1, . . . Mn are stored in a memory and the constant distances are set in a setter.

* * * * *